US008583638B2

(12) United States Patent
Donelli

(10) Patent No.: US 8,583,638 B2
(45) Date of Patent: Nov. 12, 2013

(54) ADAPTIVE MAPPING OF SEARCH RESULTS

(75) Inventor: Giovanni Donelli, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/549,276

(22) Filed: Aug. 27, 2009

(65) Prior Publication Data

US 2011/0055244 A1    Mar. 3, 2011

(51) Int. Cl.
*G06F 7/00* (2006.01)
*G06F 17/30* (2006.01)

(52) U.S. Cl.
USPC ............................................. 707/724

(58) Field of Classification Search
USPC .................................. 707/724, 725
See application file for complete search history.

(56) References Cited

U.S. PATENT DOCUMENTS

| | | | |
|---|---|---|---|
| 2004/0143569 A1 | 7/2004 | Gross et al. | |
| 2004/0158400 A1* | 8/2004 | Kouchiyama | 701/209 |
| 2005/0027705 A1* | 2/2005 | Sadri et al. | 707/5 |
| 2005/0261826 A1* | 11/2005 | Kurosawa et al. | 701/208 |
| 2006/0026170 A1 | 2/2006 | Kreitler et al. | |
| 2006/0101347 A1 | 5/2006 | Runov et al. | |
| 2008/0010262 A1* | 1/2008 | Frank | 707/3 |
| 2008/0033633 A1* | 2/2008 | Akiyoshi et al. | 701/201 |
| 2009/0005970 A1 | 1/2009 | Deardoff et al. | |

OTHER PUBLICATIONS

Zhao and Shneiderman, "Image-based Highly Interactive Web Mapping for Geo-referenced Data Publishing" University of Maryland, Nov. 23, 2002, pp. 1-13.

\* cited by examiner

*Primary Examiner* — Hosain Alam
*Assistant Examiner* — Van Oberly
(74) *Attorney, Agent, or Firm* — Kilpatrick Townsend & Stockton LLP

(57) ABSTRACT

Systems and methods are provided for processing user search request information and for updating the presentation of a map based on the processed search request information. User search information may be associated with one or more locations shown by the map. Each location associated with the user search information may be highlighted on the map. As the user refines the user search information, the map may be automatically updated such that only the locations associated with the refined user search information may be highlighted. A textual list of location names associated with highlighted locations may be concurrently displayed with the map. When a user selects one of the names in the list, the highlighted location associated with that name may be visually distinguished from the other highlighted locations.

18 Claims, 10 Drawing Sheets

| FORMAL LOCATION NAME | | VALID TERMS | | INDICATOR VALUE | | TIME ZONE | | POSITION | |
|---|---|---|---|---|---|---|---|---|---|
| 320 | | 342 | | 344 | | 346 | | 348 | |
| 302a { | AACHEN, GERMANY 320a | AACHEN; ACHEN; DE; GERMANY | | 257,935 | | CET | | 50°46'N 6°6'E | 348a |
| 302d { | LOS ANGELES, CALIFORNIA, U.S.A. 320d | LOS ANGELES; CALIFORNIA; CA; LAS ANGELES; LAX; LA; UNITED STATES OF AMERICA; US; U.S.A. 342d | | 4,018,080 | | PST | | 34°03'N 118°15'W | |
| 302g { | PHILADELPHIA, PENNSYLVANIA, U.S.A. 320g | PHILADELPHIA; PENNSYLVANIA; PA; PHL; PHILLY; UNITED STATES OF AMERICA; US; U.S.A. | | 1,447,395 344g | | EST | | 39°57'N 75°10'W | |
| 302k { | RIO DE JANEIRO, BRAZIL 320k | RIO DE JANEIRO; RIO DI JANEIRO; JANIRO; BR; BRASIL; BRAZIL | | 7,787,098 344k | | BST | | 22°54'S 43°11'W | 348k |
| 302m { | RIYADH, SAUDI ARABIA 320m | RIYADH; RYADH; SAUDI ARABIA; SA | | 4,700,000 | | EAT 346m | | 24°38'N 46°43'E | 348m |

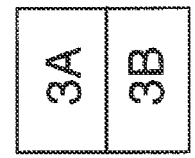

FIG. 3

| | | | | |
|---|---|---|---|---|
| 302o { | ROME, GEORGIA, U.S.A. | 320o | ROME; GEORGIA; GA; UNITED STATES OF AMERICA; US; U.S.A. | 34,980 | EST _346o_ | 34°25N 85°18W _348o_ |
| 302p { | ROME, ITALY | 320p | ROME; ROMA; ITALY; IT | 2,722,907 | CET _346p_ | 41°54N 12°30E _348p_ |
| 302q { | ROME, NEW YORK, U.S.A. | 320q | ROME; NEW YORK; NY; UNITED STATES OF AMERICA; USA; US | 34,950 _344q_ | EST _346q_ | 43°13N 75°27W _348q_ |
| 302r { | ROME CITY, INDIANA, U.S.A. | 320r | ROME CITY; INDIANA; IN; UNITED STATES OF AMERICA; USA; US | 1,615 _344r_ | EST | 41°49N 85°36W _348r_ |
| ⋮ | ⋮ | ⋮ | ⋮ | ⋮ | ⋮ | ⋮ |
| 302t { | ROTTERDAM, NETHERLANDS | 320t | ROTTERDAM; ROTTERDAM; NETHERLANDS; NL | 584,046 | CET | 51°55N 4°28E _348t_ |
| ⋮ | ⋮ | ⋮ | ⋮ | ⋮ | ⋮ | ⋮ |
| 302w { | SAN DIEGO, CALIFORNIA, USA | 320w | SAN DIEGO; CA; SON DIEGO; SD; UNITED STATES OF AMERICA; CALIFORNIA; US; U.S.A. | 1,353,993 | PST _346w_ | 32°78N 117°15W _348w_ |
| ⋮ | ⋮ | ⋮ | ⋮ | ⋮ | ⋮ | ⋮ |
| 302z { | ZYWIEC, POLAND | 320z | ZYWIEC; ZWIEC; POLAND; PL | 32,078 | CET | 49°41N 19°12E _348z_ |

_260_   _350_ MAP REPOSITORY

ADAPTIVE MAPPING OF SEARCH RESULTS

FIELD OF THE INVENTION

This can relate to systems and methods for processing user search request information and, more particularly, to systems and methods for updating the presentation of a map based on the processed search request information.

BACKGROUND OF THE DISCLOSURE

Using an electronic device (e.g., a laptop computer or portable media device), a user can search for and select a specific location, such as a location on a map. For example, an electronic device may generally attempt to match user input search information (e.g., the name of a specific location) with information in a database accessible by the device that may include a list of various locations. When multiple matches are detected between user search information and database locations, the user is often prompted to select from a list of the detected matches, and usually shown in a linear table. This approach of showing search results in a list, however, may not be very visually appealing to a user and may not easily convey the dimension of the result set, or the geographic distribution of the result set.

SUMMARY OF THE DISCLOSURE

Systems, methods, and computer-readable media for updating the presentation of a map based on processed search request information are provided.

For example, in some embodiments, there is provided a method for mapping search results. The method may include displaying a first version of a map having many positions. Responsive to a new user search input, the method may automatically highlight at least one of the many positions on the map. Each highlighted position may be associated with a location entity that at least partially matches the new user search input. The map may be representative of the world globe, and each position of the map may be associated with a city of the world globe. In order to highlight at least one of the positions on the map, the method may include accessing a table that defines a first metadata portion and a second metadata portion for many location entities. The method may then compare the new user search input to the first metadata portion of each location entity in at least a subset of the many location entities, detect at least one matching location entity based on the comparing, and provide a visual indicator on the map at each one of the positions that is associated with the second metadata portion from one of the at least one matching location entity.

In some other embodiments, there is provided a system for mapping search results. The system may include an input component for receiving user search information, a display, and a processor coupled to the display and the user input component. The processor may be operative to provide a map on the display, match the user search information with at least one location entity, and dynamically update the map with at least one visual indicator in at least one position on the map associated with the at least one location entity. In some embodiments, the processor may be further operative to present a list of at least one listed item concurrently with the dynamic update, and each listed item may be associated with a respective one of the at least one location entity. Each listed item may be textual information associated with the location name of its respective one location entity.

Moreover, in some other embodiments, there is provided computer readable media for controlling an electronic device that includes computer readable code recorded thereon for displaying on a display of the electronic device a map showing many locations, receiving updated user search information indicative of at least one location of the many locations, and automatically presenting at least one visual indicator on the map at each one of the at least one location in response to the receiving.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

The above and other aspects of the invention, its nature, and various features will become more apparent upon consideration of the following detailed description, taken in conjunction with the accompanying drawings, in which like reference characters refer to like parts throughout, and in which:

FIGS. 2 and 3 are schematic views of an application run by the electronic device of FIG. 1 in accordance with some embodiments of the invention.

DETAILED DESCRIPTION OF THE DISCLOSURE

Systems, methods, and computer-readable media for updating the presentation of a map based on processed search request information are provided and described with reference to FIGS. 1-4F.

An electronic device may be operative to display an image and to receive user input representing at least a portion of a user search term related to at least one element of the image. For example, the image may be a map, and the user search term may be related to a specific location on the map. The device may also be operative to display a list of search results related to the user search terms. Each search result may be displayed at a specific position on the image related to the search result. The search results may also be displayed as a linear list. This may provide a way to show both the distribution (e.g., the location) as well as the dimension (e.g., the number) of the search results.

Figure 1:
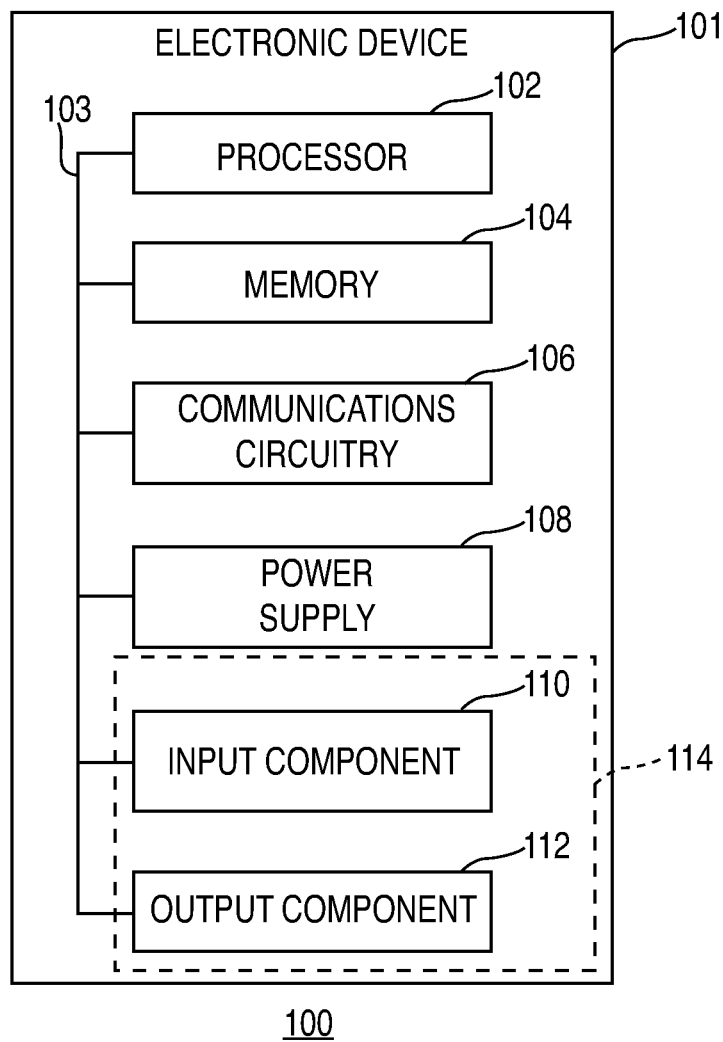
FIG. 1 is a schematic view of an illustrative electronic device in accordance with some embodiments of the invention.

FIG. 1 is a schematic view of an illustrative electronic device 100 for providing adaptive mapping of search results in accordance with some embodiments of the invention. Electronic device 100 may perform a single function (e.g., search result mapping) and, in other embodiments, electronic device 100 may perform multiple functions (e.g., a device that maps search results, plays music, and receives and transmits telephone calls). Moreover, in some embodiments, electronic device 100 may be any portable, mobile, or hand-held electronic device configured to map search results wherever the user travels. Electronic device 100 may include any suitable type of electronic device operative to map search results. For example, electronic device 100 may include a media player (e.g., an iPod™ available by Apple Inc. of Cupertino, Calif.), a cellular telephone (e.g., an iPhone™ available by Apple Inc.), a personal e-mail or messaging device (e.g., a Blackberry™ available by Research In Motion Limited of Waterloo, Ontario), any other wireless communication device, a pocket-sized personal computer, a personal digital assistant ("PDA"), a laptop computer (e.g., an MacBook™ available by Apple Inc.), a music recorder, a still camera, a movie or video camera or recorder, a radio, medical equipment, any other suitable type of electronic device, and any combinations thereof. Alternatively, electronic device 100 may not be portable at all, but may instead be generally stationary, such as a desktop computer (e.g., an iMac™ available by Apple Inc.).

Electronic device 100 may include a processor or control circuitry 102, memory 104, communications circuitry 106, power supply 108, an input component 110, and an output component 112. Electronic device 100 may also include a bus 103 that may provide a transfer path for transferring data and/or power, to, from, or between various other components of device 100. In some embodiments, one or more components of electronic device 100 may be combined or omitted. Moreover, electronic device 100 may include other components not combined or included in FIG. 1. For example, electronic device 100 may also include various other types of components, including, but not limited to, light sensing circuitry, camera lens components, or global positioning circuitry, as well as several instances of one or more of the components shown in FIG. 1. For the sake of simplicity, only one of each of the components is shown in FIG. 1.

Electronic device 100 may also be provided with a housing 101 that may at least partially enclose one or more of the components of device 100 for protecting them from debris and other degrading forces external to device 100. In some embodiments, all of the components of electronic device 100 may be provided within the same housing 101. In other embodiments, one or more of the components may be provided within its own housing (e.g., an input component 110 may be provided within its own housing and may communicate wirelessly or through a wire with a processor 102, which may be provided within its own housing).

Memory 104 may include one or more storage mediums, including, for example, a hard-drive, solid-state drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music, image, and video files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications circuitry 106 may be provided to allow device 100 to communicate with one or more other electronic devices or servers (not shown) using any suitable communications protocol. For example, communications circuitry 106 may support Wi-Fi (e.g., an 802.11 protocol), Ethernet, Bluetooth™, high frequency systems (e.g., 900 MHz, 2.4 GHz, and 5.6 GHz communication systems), cellular networks (e.g., GSM, AMPS, GPRS, CDMA, EV-DO, EDGE, 3GSM, DECT, IS-136/TDMA, iDen, LTE, or any other suitable cellular network or protocol), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), voice over internet protocol ("VoIP"), any other communications protocol, or any combination thereof. Communications circuitry 106 may also include circuitry that can enable device 100 to be electrically coupled to another device (e.g., a computer or an accessory device) and communicate with that other device, either wirelessly or via a wired connection.

Power supply 108 can include any suitable circuitry for receiving and/or generating power, and for providing such power to one or more components of electronic device 100. In some embodiments, power supply 108 can be coupled to a power grid (e.g., when device 100 is not acting as a portable device or when a battery of the device is being charged at an electrical outlet with power generated by an electrical power plant). As another example, power supply 108 can be configured to generate power from a natural source (e.g., solar power using solar cells). In some embodiments, power supply 108 can include one or more batteries for providing power (e.g., when device 100 is acting as a portable device). For example, power supply 108 can include one or more of a battery (e.g., a gel, nickel metal hydride, nickel cadmium, nickel hydrogen, lead acid, or lithium-ion battery), an uninterruptible or continuous power supply ("UPS" or "CPS"), and circuitry for processing power received from a power generation source (e.g., power generated by an electrical power plant and delivered to the user via an electrical socket or otherwise).

Input component 110 may be any component suitable to permit a user to interact or interface with device 100. For example, input component 110 can take a variety of forms, including, but not limited to, an electronic device pad, dial, click wheel, scroll wheel, touch screen, one or more buttons (e.g., a keyboard), mouse, joy stick, microphone, track ball, and combinations thereof. Input component 110 may be operative to convert, and encode/decode, if necessary, analog signals and other signals into digital data. In some embodiments, input component 110 may convert digital data into any other type of signal, and vice-versa. For example, input component 110 may receive and convert physical contact inputs (e.g., using a multi-touch screen), physical movements (e.g., using a mouse or sensor), analog audio signals (e.g., using a microphone), or any other input. The digital data can be provided to and received from processor 102, memory 104, or any other component of electronic device 100. Although input component 110 is illustrated in FIG. 1 as a single component of electronic device 100, several instances of input component 110 can be included in electronic device 100. Each input component 110 can be configured to provide one or more dedicated control functions for making selections or issuing commands associated with operating electronic device 100.

Output component 112 may also include any suitable output mechanism or component for presenting information (e.g., textual, graphical, audible, and/or tactile information) to a user of electronic device 100. For example, output component 112 may include any suitable output component or mechanism and can take a variety of forms, including, but not limited to, audio speakers, headphones, audio line-outs, visual displays, antennas, infrared ports, rumblers, vibrators, or combinations thereof.

In some embodiments, output component 112 may include image display circuitry (e.g., a screen or projection system) as an output component for providing a display visible to the user. For example, the display circuitry may include a screen (e.g., a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof) that is incorporated in electronic device 100. As another example, the display circuitry may include a movable display or a projecting system for providing a display of content on a surface remote from electronic device 100 (e.g., a video projector, a head-up display, or a three-dimensional (e.g., holographic) display).

In some embodiments, display circuitry of output component 112 can include a coder/decoder ("CODEC") to convert digital media data into analog signals. For example, the display circuitry, or other appropriate circuitry within electronic device 100, may include video CODECS, audio CODECS, or any other suitable type of CODEC. Display circuitry also can include display driver circuitry, circuitry for driving display drivers, or both. The display circuitry may be operative to display content (e.g., media playback information, application screens for applications implemented on the electronic device, information regarding ongoing communications operations, information regarding incoming communications requests, or device operation screens) under the direction of processor 102.

It should be noted that one or more input components 110 and one or more output components 112 may sometimes be referred to collectively herein as an I/O interface 114. It should also be noted that an input component 110 and an output component 112 of I/O interface 114 may sometimes be a single I/O component, such as a touch screen that may receive input information through a user's touch of a display screen and that may also provide visual information to a user via that same display screen.

Processor 102 may include any processing circuitry operative to control the operations and performance of electronic device 100. For example, processor 102 may be used to run operating system applications, firmware applications, media playback applications, media editing applications, or any other application. In some embodiments, processor 102 may receive input signals from input component 110 (e.g., a keyboard) and/or drive output signals through an output component 112 (e.g., a display). Processor 102 may load a user interface program (e.g., a program stored in memory 104 or a program provided by another remote device or server via communications circuitry 106) to determine how instructions or data received via input component 110 may manipulate the way in which information is provided to the user via output component 112.

Figure 2:
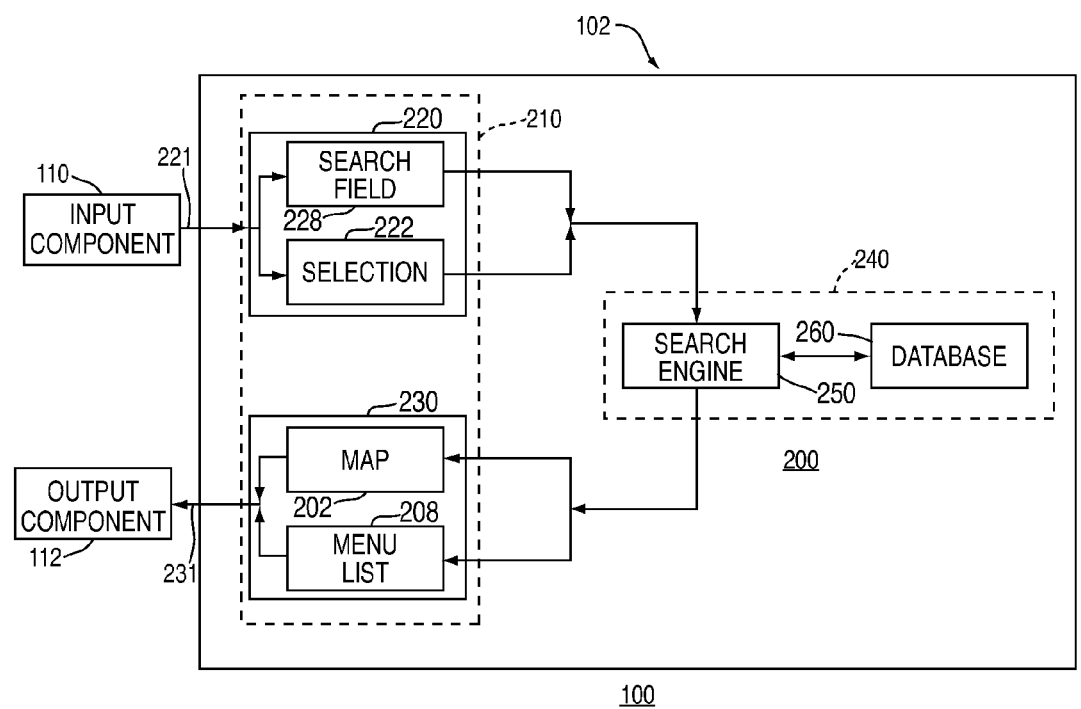

To enhance a user's experience interacting with electronic device 100, the electronic device can provide a user interface application that may continuously update the presentation of a map or any other suitable type of image with one or more visual indicators as a user updates search information related to the map. For example, as shown in FIG. 2, a search application 200 may be loaded by processor 102 (e.g., from memory 104 or from a remote entity via communications circuitry 106). Application 200 may include a user interface ("UI") 210 having a user interface input portion 220 for receiving user search information 221 from a user and a user interface output portion 230 for providing application presentation information 231 to the user. Application 200 may also include a controller 240 for processing user search information 221 and for generating application presentation information 231 based on the processed user search information. Controller 240 may include a search engine 250 and a database 260, an illustrative embodiment of which is shown in FIG. 3.

UI output portion 230 may generate a map 202 as a portion of presentation information 231 provided to a user on output component 112 (e.g., a video display). The user may provide a search field 228 of UI input portion 220 with at least a portion of a user search term related to map 202 using user search information 221 via input component 110 (e.g., a keyboard). Controller 240 may process this user search term information and may update the presentation of map 202 on display 112 with one or more visual indicators based on the processed user search term information.

In some embodiments, UI output portion 230 may also generate a menu list 208 as a portion of presentation information 231. Menu list 208 may include one or more menu items associated with at least some of the visual indicators provided by map 202. Furthermore, in some embodiments, the user may also use a portion of user search information 221 to choose a selection 222 of UI input portion 220. Selection 222 may be associated with at least one of the one or more menu items provided by menu list 208. In response to selection 222, UI output portion 230 may update the presentation of map 202 and/or menu list 208 based on selection 222.

Controller 240 of search application 200 may include search engine 250 and database 260. Engine 250 may receive user search term information from search field 228 of UI input portion 220. This user search term information may include at least a portion of a user search term related to a specific location depicted by map 202. Engine 250 may compare this user search term information to information of one or more location entities defined by database 260. As shown in FIG. 3, for example, database 260 may include a search table 300. Search table 300 may include one or more location entities 302 related to one or more specific locations 220 depicted by map 202.

As shown in FIG. 3, for example, database 260 may include search table 300. Search table 300 may include one or more location entities 302 (e.g., entities 302a-302z). Each location entity 302 may include a specific location 320 (e.g., a location that may be depicted by map 202) as well as various types of metadata 340 associated with each location 320 (e.g., textual information and/or graphical information related to that specific location). As shown, each location entity 302 of table 300 may include the name of a specific location 320. For example, location data 320 may be textual information, such as a string of one or more alphanumeric characters. Location 320 for each location entity 302 may be the formal name of a specific location depicted by map 202. Although table 300 may be visually ordered in any suitable way, in some embodiment, table 300 may be visually ordered alphabetically with respect to location data 320 of each entity 302. For example, as shown in FIG. 3, location entity 302a may include an associated piece of location data 320a that is the location name "Aachen, Germany", location entity 302w may include an associated piece of location data 320w that is the location name "San Diego, Calif., U.S.A.", and location entity 302z may include an associated piece of location data 320z that is the location name "Zywiec, Poland".

All metadata 340 for each location entity 302 may be information associated with the specific location described by location data 320 of that entity 302. For example, a particular piece of metadata 340 that may be associated with a particular location 320 of a particular location entity 302 is textual information metadata. Such textual information may also be a string of one or more alphanumeric characters representative or descriptive of the location 320. For example, valid term metadata 342 of an entity 302 may include one or more strings of one or more alphanumeric characters representing various descriptive terms that may be associated with the location 320 of that entity.

In some embodiments, valid term metadata 342 may include one or more descriptive terms that should be associated with the respective location 320, including not only each of the specific terms of location 320, but also any variations on the spelling of that location and/or any nicknames or other terms commonly attributed to that location. For example, as shown in FIG. 3, location entity 302d may include an associated piece of location data 320d that is the location name "Los Angeles, Calif., U.S.A.", and associated valid term metadata 342d that may include one or more terms to be considered a valid match for the specific location of location data 320d. For example, not only may valid term metadata 342d include one or more of the alphanumeric string terms included in location data 320d (e.g., "Los" and "Angeles" and "California" and "U.S.A."), but valid term metadata 342d may also include one or more additional alphanumeric string terms that may also be associated with the specific location data 320d (e.g., common misspellings such as "Las", common abbreviations such as "L.A.", and common nicknames such as "LAX").

As an example, search engine 250 may receive user search term information from search field 228 of UI input portion 220. This user search term information may include at least a portion of a user search term related to a specific location depicted by map 202. Engine 250 may compare this user search term information to data provided by table 300 of database 260 to determine whether or not any of the location entities 302 are related to the user search. Therefore, if a user provides "L.A." as at least a portion of user search term information, query engine 250 may identify at least one match based on valid term metadata 342d associated with location 320d of location entity 302d. In other embodiments, table 300 may not include valid term metadata 342, and if a user provides "L.A." as at least a portion of user search term information, query engine 250 may be unable to identify at least one match, for example, because location data 320d does not include "L.A.".

Another particular type of metadata 340 that may be associated with particular location data 320 of a particular location entity 302 in table 300 of database 260 is graphical information. Such graphical information may be an image or other data indicative of how the location entity 302 may be depicted, highlighted, distinguished, or otherwise identified by user interface 210 on map 202 (e.g., using one or more visual indicators).

For example, indicator value metadata 344 may include a numeric value associated with the total human population of the respective location 320 of its respective location entity 302. As shown in FIG. 3, location entity 302g may include an associated piece of location data 320g that is the location name "Philadelphia, Pa., U.S.A.", and associated indicator value metadata 344g that may include one or more values to be considered when highlighting or otherwise representing location 320g on map 202 using one or more visual indicators (e.g., numeric value "1,447,395" indicative of the human population of Philadelphia). Similarly, location entity 302k may include an associated piece of location data 320k that is the location name "Rio de Janeiro, Brazil", and associated indicator value metadata 344k that may include one or more similar values to be considered when highlighting or otherwise representing location 320k on map 202 using one or more visual indicators (e.g., numeric value "7,787,098" indicative of the human population of Rio de Janeiro).

"Highlighting," "distinguishing," "indicating," and/or "identifying", as may be used herein, is not limited to the specific effects described and illustrated. Rather, these terms may refer to any form of effect by which some locations may be distinguished from others on map 202 or elsewhere on UI 210. Examples of such effects may include, but are not limited to, changing the size, shape, color, contrast, and/or any other visual feature of an associated name, icon, or other item or identifier representative of the location on map 202. In other embodiments, highlighting, distinguishing, and/or identifying may refer to displaying one or more identifiers or indicators representative of one or more locations on map 202 in a specific area of display 112, such as by zooming in on or out from a portion of map 202 that may include one or more of the identifiers. In yet other embodiments, highlighting, distinguishing, and/or identifying may be accomplished using non-visual means, for example, such that highlighted items or identifiers can produce a distinctive sound when pointed at by a cursor or other type of input component 110, or they can have a distinctive tactile characteristic.

Another particular type of metadata 340 that may be associated with particular location data 320 of a particular location entity 302 in table 300 of database 260 is grouping information. Such grouping information may be any data indicative of how two or more location entities may be defined as a single group. For example, time zone metadata 346 of an entity 302 may include an alphanumeric string or any other type of data representing a characteristic that may be associated with multiple locations 320 (e.g., the time zone region in which multiple locations 320 may reside). In some embodiments, time zone metadata 346 may include an alphanumeric value associated with a specific time zone of one or more location entities 302. For example, as shown in FIG. 3, location entity 302m may include an associated piece of location data 320m that is the location name "Riyadh, Saudi Arabia", and associated time zone metadata 346m that may include a time zone descriptor to be considered when adjusting the time zone associated with device 100 (e.g., descriptor "EAT" that may be representative of the "East Africa Time Zone" associated with Riyadh). This value "EAT" of metadata 346 may be unique to only location entity 302m of table 300. However, as another example, as shown in FIG. 3, location entities 302o and 302q may include a respective piece of time zone metadata 346 having the same value (e.g., time zone metadata 346o associated with "Rome, Georgia, U.S.A." location data 320o and time zone metadata 346q associated with "Rome, New York, U.S.A." may each have a value "EST" that may be representative of the "Eastern Standard Time Zone").

Another particular type of metadata 340 that may be associated with particular location data 320 of a particular location entity 302 in table 300 of database 260 is positional information. Such positional information may be coordinates or other information indicative of where the location entity 302 may be depicted, highlighted, distinguished, or otherwise identified by user interface 210 on map 202 (e.g., using one or more visual indicators). For example, position metadata 348 of an entity 302 may include one or more strings of one or more alphanumeric characters representing a characteristic associated with the position of the specific location 320 of that entity on map 202.

In some embodiments, position metadata 348 may include geographic coordinates associated with the actual physical location of location 320 on the globe. This information may be synthesized with coordinate data of map 202 to identify the specific position of location 320 on map 202. For example, as shown in FIG. 3, location entity 302r may include an associated piece of location data 320r that is the location name "Rome City, Ind., U.S.A.", and associated position metadata 348r that may include one or more values to be considered when highlighting or otherwise representing location 320r on map 202 (e.g., coordinate value "41°49N/85°36W" indicative of the position of Rome City on the globe). Similarly, location entity 302t may include an associated piece of location data 320t that is the location name "Rotterdam, Netherlands", and associated position metadata 348t that may include one or more values to be considered when highlighting or otherwise representing location 320t on map 202 (e.g., coordinate value "51°55N/4°28E" indicative of the position of Rotterdam on the globe).

There are many other various types of metadata 340 that can be associated with a particular location 320 of a particular entity 302 of library 300. For example, such a particular piece of metadata may include preference information (e.g., media playback preferences), exercise information (e.g., information obtained by exercise monitoring equipment), transaction information (e.g., information such as credit card information), subscription information (e.g., information that keeps track of podcasts or television shows or other media a user subscribes to), contact information (e.g., telephone numbers and email addresses), calendar information, or any other suitable type of information that a user or other entity may wish to associate with a particular location 320 that may be identified and/or selected by a user of device 100.

At least portions of each table of any database associated with any application (e.g., table 300 of database 260 of application 200) may be stored in any memory component of device 100 (e.g., memory 104 of FIG. 1) or may be made accessible to device 100 by any remote device or server (e.g., via communications circuitry 106 of FIG. 1), for example. In some embodiments, most of table 300 may be stored locally on device 100 (e.g., in memory 104), but indicator value metadata 344 for one or more entities 302 may be data stored on a separate server or device (e.g., data that may be provided via a remote server that continually updates indicator value metadata 344, such as when the population of a city changes). When some portion of table 300 is stored locally and other portions are stored on a separate server, the portion on the device may store pointers (e.g., URLs) to the corresponding portions of the table stored on remote servers, for example.

FIGS. 4A-4F show illustrative views of a visual representation 400 of user interface 210 of search application 200 in various stages of use for updating the current time zone to be associated with device 100 (e.g., for updating a clock of the device or for loading certain user preferences associated with the current time zone). For example, as shown in FIGS. 4A-4F, visual representations 400 may show user generated information interacting with user interface 210 of search application 200 for updating the current time zone of device 100 from Pacific Standard Time ("PST") related to a user's previous location in San Diego, Calif., U.S.A. to Central European Time ("CET") related to the user's current location in Rome, Italy.

While visual representations 400 of FIGS. 4A-4F are described with reference to the various components and contents of electronic device 100, search application 200, and search table 300 of FIGS. 1-3, any other suitable electronic device, any other suitable type of search application, and any other suitable type of search table may also be used. Moreover, search application 200 is often described with specific reference to a map of the globe and the locations of various cities depicted by the globe, for the specific use of updating the current time zone associated with the device. However, application 200 may utilize any other suitable type of map or image depicting any other suitable type or types of locations or entities for any other suitable purpose. For example, in another embodiment, a photograph of various people may be searched to highlight the faces of only those people with a specific name or other characteristic.

Figure 4A:
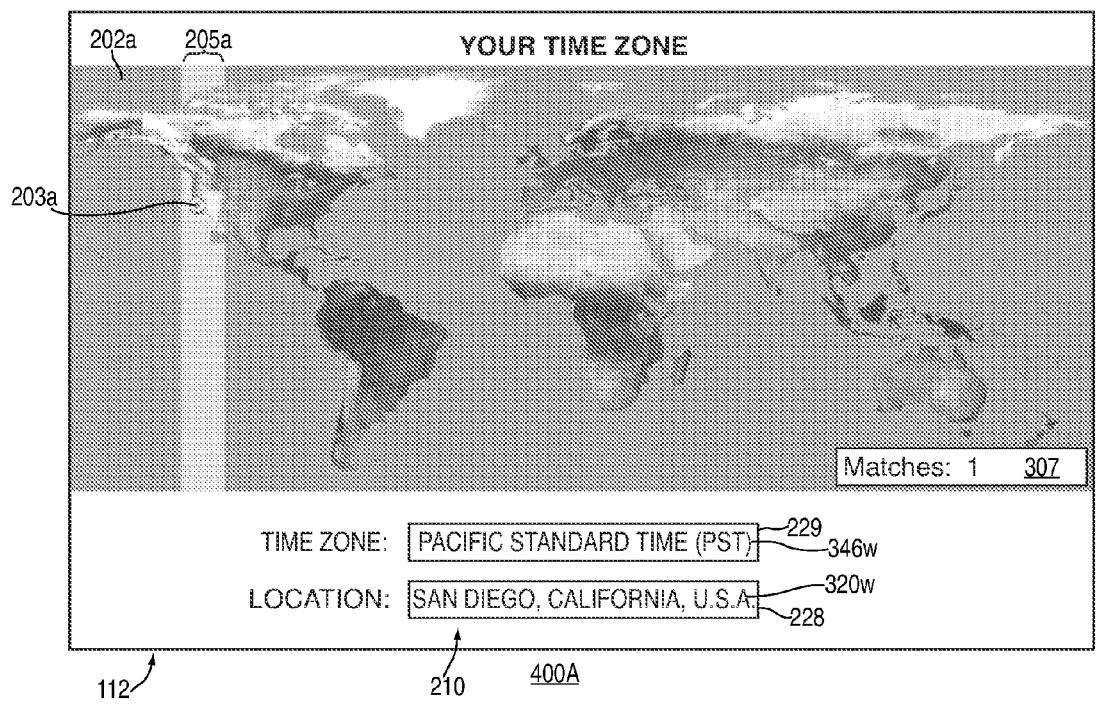
FIGS. 4A-4F show various representations of a user interface of the application of FIGS. 2 and 3 in accordance with some embodiments of the invention.

As shown in FIG. 4A, for example, user interface 210 may present visual representation 400A related to previous location information of device 100 on display output component 112. UI output portion 230 may generate and present a map 202a that may, for example, illustrate a map of the world. Map 202a may at least depict at least one specific location associated with the time zone to be updated. For example, as shown in FIG. 4A, map 202a may at least depict the location of San Diego, Calif., U.S.A. associated with the Pacific Standard Time Zone ("PST") to be updated with the Central European Time Zone ("CET") associated with the user's current location in Rome, Italy.

Therefore, in some embodiments, UI output portion 230 may also present a visual indicator 203a at a certain position on map 202a indicative of San Diego. For example, with reference to table 300 of database 260 of FIG. 3, application 200 may recall the previously selected location entity 302 used to define the time zone of device 100 (e.g., location entity 302w), and may update the presentation of map 202a with visual indicator 203a at a position on map 202a based at least partially on metadata associated with that entity (e.g., position metadata 348w). Application 200 may also update search field 228 of UI 210 with the name of the location of that entity (e.g., location data 320w). Similarly, application 200 may also update a time zone field 229 of UI 210 with the name of the time zone associated with that entity (e.g., time zone metadata 346w). UI output portion 230 may also present a visual zone region 205a along a certain portion of map 202a indicative of the Pacific Standard Time Zone (e.g., using a certain shading or other highlighting technique). Thus, user interface 210 may present visual representation 400A on display 112 that is indicative of the previously stored location information (e.g., time zone information) of device 100.

Figure 4B:
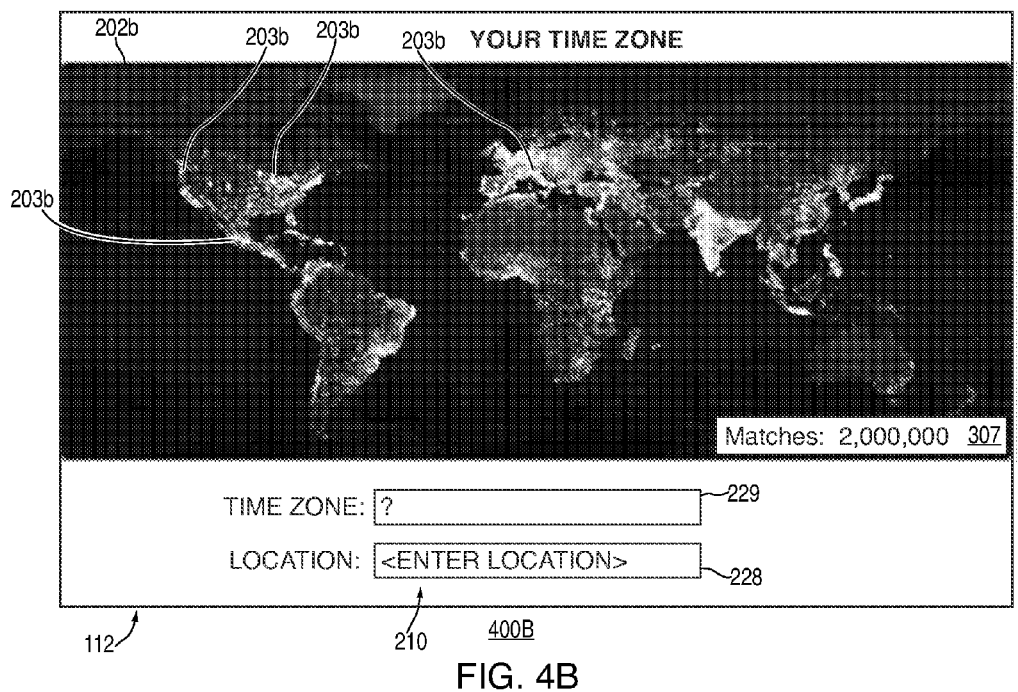

As shown in FIG. 4B, for example, user interface 210 may present visual representation 400B on display 112 such that a user may begin to use application 200 to search for a location to define the current time zone of device 100. UI output portion 230 may generate and present a map 202b that may, for example, illustrate a map of the world. Map 202b may be substantially similar to map 202a used in FIG. 4A to depict the previous time zone of the device. However, in some embodiments, as shown in FIGS. 4A and 4B, map 202a may be a "photorealistic" representation or view of the globe (e.g., a map that may distinguish between various environmental conditions, such as green verdant portions of the globe and tan dry portions of the globe), while map 202b may be an "artistic" representation or view of the globe (e.g., a map that may simply provide an outline of the shape of the land masses without any or many distinctive features between various portions). Additionally or alternatively, in some embodiments, as shown in FIGS. 4A and 4B, map 202a may be displayed as if the sun were shining on all portions of the globe (e.g., a "day view" of the globe), while map 202b may be displayed as if the sun were not shining on any portion of the globe (e.g., a "night view" of the globe).

For example, a photorealistic and/or day view of the globe (e.g., map 202a) may be used to show a well defined selected location (e.g., San Diego, Calif.), while an artistic and/or night view of the globe (e.g., map 202b) may be used to indicate to a user that a search operation may be in progress and to display visual indicators related to one or more search results. Therefore, application 200 can indicate different modes by transitioning from a first representation of an entity being presented by map 202 to a second representation of that same entity. For example, a transition from a day view of the globe (e.g., map 202a of FIG. 4A) to a night view of the globe (e.g., map 202b of FIG. 4B) can indicate a transition from a "confirmed mode" to a "search mode" of application 200. Various other changes may be made between two representations of a mapped entity to indicate various modes of application 200. For example, a transition from a "zoomed-in" view of a portion of the globe showing a well defined selected location to a "zoomed-out" view of a larger portion or all portions of the globe can indicate the transition from the confirmed mode to the search mode of the application.

Database 260 may also include one or more graphical representations of maps or other entities that may be displayed to the user by UI 210 of application 200. For example, as shown in FIG. 3, database 260 may also include map repository 350 that may include one or more graphical representations of map 202 (e.g., map 202a and map 202b). Moreover, each map may include associated metadata that may be updated in order to alter the presentation of the map. For example, a photorealistic view of a map 202 may include detail regarding current snowfall along different geographical portions of the map. This snowfall information may be obtained by a remote server or any other suitable mechanism and may be used to update one or more of the maps provided by repository 350. Alternatively, "generic" snowfall conditions may be determined based on the current month of the year (e.g., based on the current calendar settings of the device). Moreover, repository 350 may include one or more graphical representations of visual indicators or other graphics used by application 200.

The search mode can be considered a transient mode in which it may be possible for the user to search for locations according to user search information until a certain location is selected and confirmed by the user. When the selection of a location is confirmed, application 200 may transition map 202 from a "search mode view" (e.g., an artistic view and/or a night view and/or a zoomed-out view of the globe) to a "confirmed mode view" (e.g., a photorealistic view and/or a day view and/or a zoomed-in view of the globe). In a search mode represented by a night view, for example, search results may be represented on map 202 by twinkling dots positioned at map locations associated with some or all of the search results. The number of dots can vary depending on the number of search results. This may provide an elegant way of showing both the distribution (i.e., the location) and the dimension (i.e., the number) of the results of the user query. The size, shape, and/or color of the dots or visual indicators may be varied to further distinguish certain locations for which the user might have a higher interest.

For example, as shown in FIG. 4B, when application 200 enters a search mode (e.g., in response to a user request to update device time zone data, such as a request generated by input component 110 or any other suitable mechanism), UI output portion 230 may generate and present map 202b as well as multiple visual indicators 203b at multiple positions on map 202b indicative of some or all of the potential locations that may be searched through by the user. For example, with reference to table 300 of database 260 of FIG. 3, application 200 may detect all of the location entities 302 available in table 300 (e.g., location entities 302a-302z), and may update the presentation of map 202b with multiple visual indicators 203b at multiple positions on map 202b based at least partially on metadata associated with each respective detected entity (e.g., position metadata 348a-348z). As shown in FIG. 4B, each visual indicator 203b may be a bright dot that may contrast well with the otherwise dark representation of the night view of the globe of map 202b. Each visual indicator 203b of FIG. 4B may have a different appearance than visual indicator 203a of FIG. 4A, which may have a larger, "bulls-eye" type design. This style of visual indicator may be used when application 200 is presenting the confirmed mode view of map 202 and a particular location has been selected and confirmed by the user.

Application 200 may also update search field 228 of UI 210 with a prompt for the user to enter user search information 221 into field 228 (e.g., an "<Enter Location>" prompt, as shown in FIG. 4B). Similarly, application 200 may also update time zone field 229 of UI 210 to indicate that a particular time zone has not yet been determined. Thus, user interface 210 may present visual representation 400B on display 112 that is indicative of an initial search condition awaiting user search information to narrow down the number of potential locations of device 100.

Figure 4C:
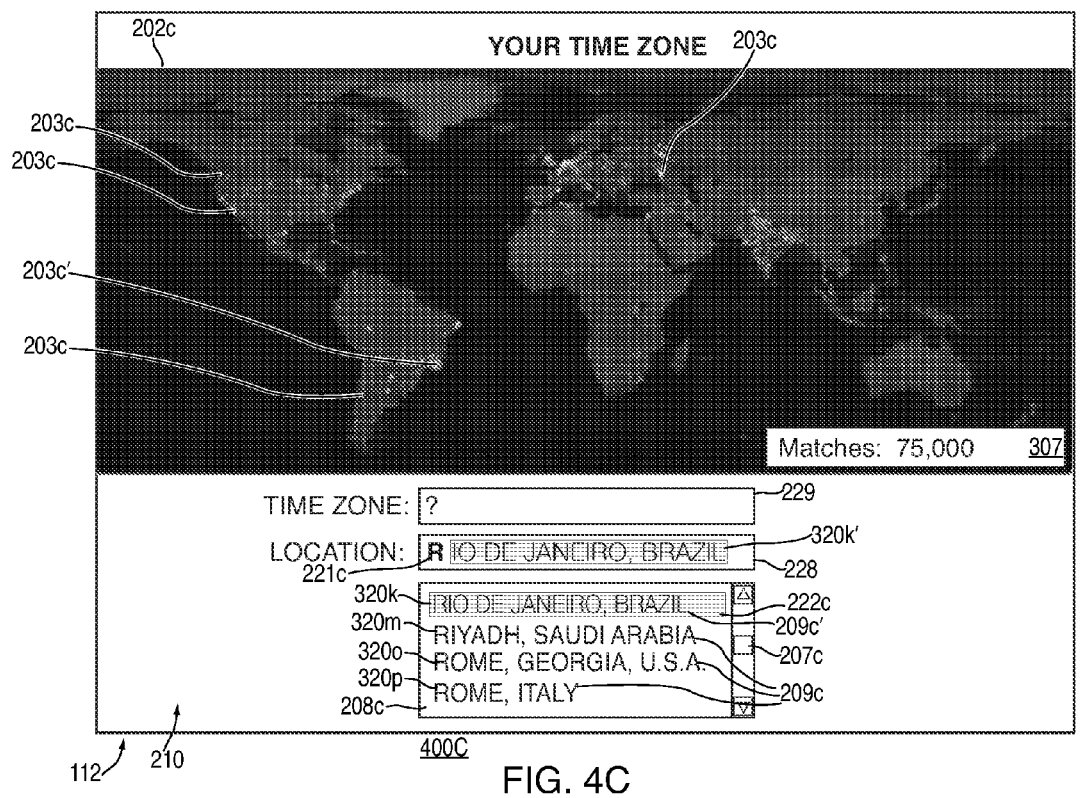

As shown in FIG. 4C, for example, user interface 210 may present visual representation 400C on display 112 in response to a user entering user search information 221c into search field 228. As mentioned, a user may provide search field 228 of UI input portion 220 with user search information 221 via input component 110 (e.g., a keyboard). For example, user search information 221 entered into search field 228 may be representative of at least a portion of a user search term related to a location of map 202. Controller 240 may automatically process user search term information 221 of search field 228 and may automatically update the presentation of map 202 and/or visual indicators 203 on map 202 based on the processed user search term information. This processing and updating may occur immediately and automatically in response to receiving new user search term information 221, such that the mapping of search results may appear as quickly as a user may amend its search terms. This dynamic or adaptive mapping of search results may significantly enhance the user experience.

With respect to representation 400c of FIG. 4C, a user may begin the search by providing search field 228 of UI input portion 220 with user search information 221c defined by the alphanumeric character "R". In response to receiving this user search term information 221c, search engine 250 may compare user search term information 221c to at least certain information defined by one or more location entities 302 of table 300 in database 260. For example, engine 250 may compare user search term information 221c to alphanumeric strings of valid term metadata 342 of one or more location entities 302 of database 260. For every detected match between user search term information 221c and valid term metadata 342 of one or more location entities 302, engine 250 may extract the position metadata 348 of each of those matched entities 302. Then, application 200 may update the presentation of map 202 with one or more visual indicators 203 at one or more positions on map 202 based at least partially on this extracted position metadata 348 associated with each respective matched entity.

Following the example of user search term information 221c defined by the alphanumeric character "R", controller 240 may process information 221c by using engine 250 to compare information 221c with table 300 to detect matches with valid term metadata 342 of at least location entities 302k, 302m, 302o, 302p, 302q, 302r, and 302t. Therefore, application 200 may update the presentation of map 202 with one or more visual indicators 203 at positions on map 202 based at least partially on position metadata 348 of at least location entities 302*k*, 302*m*, 302*o*, 302*p*, 302*q*, 302*r*, and 302*t*. As shown in FIG. 4C, UI output portion 230 may generate and present a map 202*c* that may, for example, be substantially similar to map 202*b* of FIG. 4B (e.g., an artistic night view of the globe). Based on the processing of user search term information 221*c* by controller 240, UI output portion 230 may also generate and present visual indicators 203*c* at positions on map 202*c* indicative of some or all of the potential location entities 302 that match the user's entered search term information 221*c* (i.e., position metadata 348*k*, 348*m*, 348*o*, 348*p*, 348*q*, 348*r*, and 348*t* of matched location entities 302*k*, 302*m*, 302*o*, 302*p*, 302*q*, 302*r*, and 302*t*). Like indicators 203*b* of FIG. 4B, each visual indicator 203*c* may be a bright dot that may contrast well with the otherwise dark representation of the night view of the globe of map 202*c*. However, the number of indicators 203*c* of FIG. 4C may be less than the number of indicators 203*b* of FIG. 4B due to the search results being limited by the matches detected between user search term information 221*c* and information of table 300.

In some embodiments, UI output portion 230 may also generate a menu list 208 as a portion of presentation information 231. Menu list 208 may include one or more menu items 209 associated with at least some of the visual indicators 203 provided by map 202. Furthermore, in some embodiments, the user may also use a portion of user search information 221 (e.g., by scrolling up or down using a scroll wheel input component 110, such as with respect to scroll 207 of UI 210) to choose a particular menu item 209 as a selection 222 of UI input portion 220. In response to selection 222 of a particular menu item 209, UI output portion 230 may update the presentation of map 202 and/or the presentation of at least one visual indicator 203 based on selection 222.

For example, for every detected match between user search term information 221*c* and valid term metadata 342 of one or more location entities 302, engine 250 may also extract the location data 320 of each of those matched entities 302. Then, application 200 may generate menu list 208 with one or more menu items 209 based on the extracted location data 320 of each matched entity.

Following the example of user search term information 221*c* defined by the alphanumeric character "R", controller 240 may process information 221*c* by using engine 250 to compare information 221*c* with table 300 to detect matches with valid term metadata 342 of at least location entities 302*k*, 302*m*, 302*o*, 302*p*, 302*q*, 302*r*, and 302*t*. Based on the processing of user search term information 221*c* by controller 240, UI output portion 230 may also generate and present menu list 208*c* with one or more menu items 209*c* descriptive of some or all of the location entities 302 that match the user's entered search term information 221*c* (e.g., location data 320*k*, 320*m*, 320*o*, 320*p*, 320*q*, 320*r*, and 320*t* of matched location entities 302*k*, 302*m*, 302*o*, 302*p*, 302*q*, 302*r*, and 302*t*). Therefore, each item 209*c* in list 208*c* may have an associated indicator 203*c* on map 202*c*.

Selection 222*c* may also be provided for highlighting a particular item 209*c* in list 208*c*. As shown in FIG. 4C, selection 222*c* may highlight item 209*c'* associated with location 320*k* (e.g., "Rio de Janeiro, Brazil"). When a particular item 209 is highlighted by selection 222, the indicator 203 associated with that item 209 may be altered. For example, as shown in FIG. 4C, when item 209*c'* associated with location 320*k* (e.g., "Rio de Janeiro, Brazil") is highlighted by selection 222*c*, the visual indicator 203 associated with location 320*k* (e.g., the visual indicator 203 positioned on map 202*c* based on position metadata 348*k*) may be altered to distinguish that indicator from all other indicators of map 202*c* (e.g., see visual indicator 203*c'*, which may include a dot and an outer ring at a position on map 202*c* associated with Rio de Janeiro, Brazil). When the user scrolls selection 222*c* to highlight another menu item 209 in list 208, the visual indicator 203 associated with that selected item 209 may be altered, and the visual indicator 203*c'* associated with previously selected item 209*c'* may return to its normal appearance (e.g., as it appeared on map 202*b* of FIG. 4B). This may provide the user with an easy way to correlate each listed item 209 in list 208 with its respective visual indicator 203 on map 202. This may help the user determine which search result is desired.

Application 200 may also supplement user search information 221 in search field 228 of UI 210 with at least a portion of selected item 209. For example, as shown in FIG. 4C, the portion of location data 320*k* not provided by user search information 221*c* (e.g., "io de Janeiro, Brazil" portion 320*k'*) may be automatically filled into search field 228 to help guide the user.

Moreover, in some embodiments, UI output portion 230 may also generate a match counter 307 as a portion of presentation information 231. Match counter 307 may provide the user with the number of indicators 203 provided on a map 202, the number of menu items 209 provided in a list 208, or any other number associated with the number of location entities 302 currently represented by user interface 210. This may provide the user with another easy way to determine the dimension (i.e., the number) of generated search results of a user query.

Figure 4D:
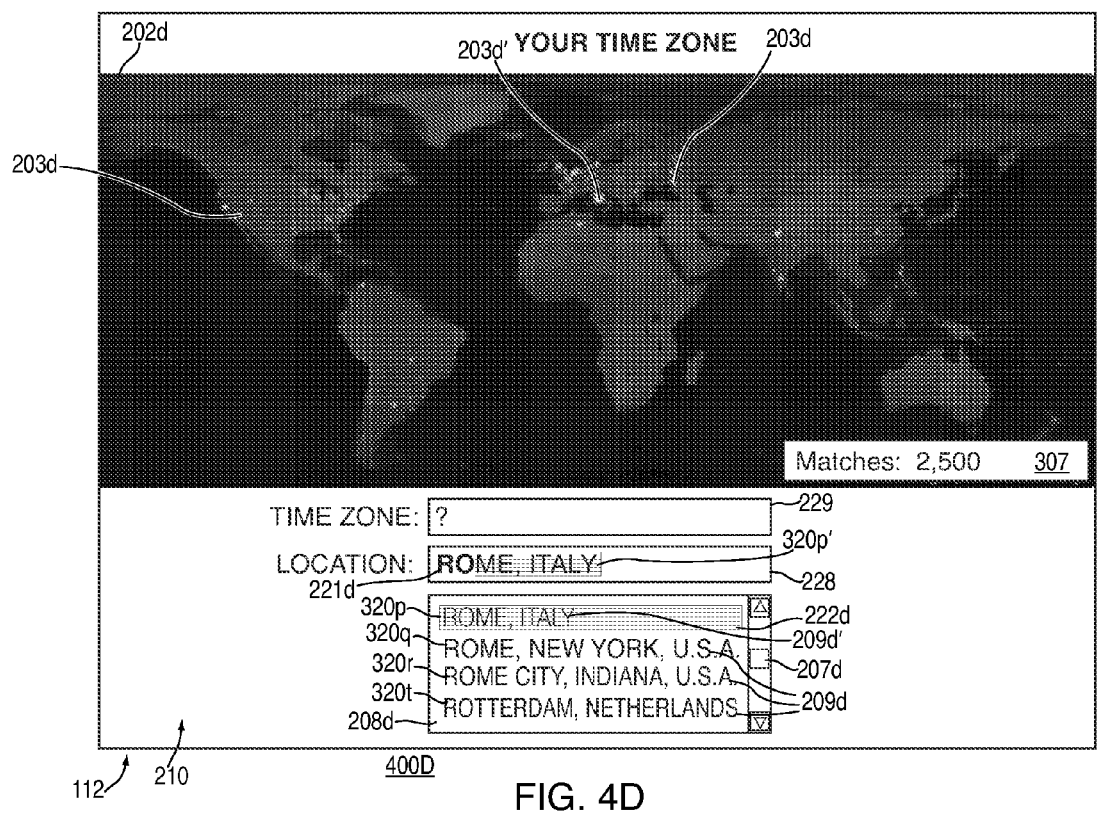

As shown in FIG. 4D, for example, user interface 210 may present visual representation 400D on display 112 in response to a user entering user search information 221*d* into search field 228. Continuing with a search based on the results presented in FIG. 4C, the user may proceed by providing search field 228 of UI input portion 220 with user search information 221*d* defined by the alphanumeric character string "RO". For example, this may be done by simply adding "O" to previous user search information 221*c* of FIG. 4C. In response to receiving this new user search term information 221*d*, search engine 250 may compare user search term information 221*d* to at least certain information defined by one or more location entities 302 of table 300 in database 260. For example, engine 250 may compare user search term information 221*d* to alphanumeric strings of valid term metadata 342 of one or more location entities 302 of database 260. In some embodiments, engine 250 may compare information 221*d* with information from only those entities 302 that provided a match during the processing of information 221*c*. This may reduce the processing requirements of application 200. For every detected match between user search term information 221*d* and valid term metadata 342 of one or more location entities 302, query engine 250 may extract the position metadata 348 of each of those matched entities 302. Then, application 200 may update the presentation of map 202 with one or more visual indicators 203 at one or more positions on map 202 based at least partially on this extracted position metadata 348 associated with each respective matched entity.

Following the example of user search term information 221*d* defined by the alphanumeric characters "RO", controller 240 may process information 221*d* by using engine 250 to compare information 221*d* with table 300 to detect matches with valid term metadata 342 of at least location entities 302*o*, 302*p*, 302*q*, 302*r*, and 302*t*. Therefore, application 200 may update the presentation of map 202 with one or more visual indicators 203 at positions on map 202 based at least partially on position metadata 348 of at least location entities 302*o*, 302*p*, 302*q*, 302*r*, and 302*t*. As shown in FIG. 4D, UI output portion 230 may generate and present a map 202*d* that may, for example, be substantially similar to map 202*b* of FIG. 4B and map 202*c* of FIG. 4C (e.g., an artistic night view of the globe). Based on the processing of user search term information 221*d* by controller 240, UI output portion 230 may also generate and present multiple visual indicators 203*d* at multiple positions on map 202*d* indicative of some or all of the potential location entities 302 that match the user's entered search term information 221*d* (i.e., position metadata 348*o*, 348*p*, 348*q*, 348*r*, and 348*t* of matched location entities 302*o*, 302*p*, 302*q*, 302*r*, and 302*t*). Like indicators 203*c* of FIG. 4C, each visual indicator 203*d* may be a bright dot that may contrast well with the otherwise dark representation of the night view of the globe of map 202*d*. However, the number of indicators 203*d* of FIG. 4D may be less than the number of indicators 203*c* of FIG. 4C due to the search results being limited by the more specific user search term information 221*d* as compared to user search term information 221*c*. Therefore, UI output portion 230 may simply remove certain indicators 203 from map 202 when updating map 202 in response to new user search term information 221*d*.

Furthermore, based on the processing of user search term information 221*d* by controller 240, UI output portion 230 may also generate and present menu list 208*d* with one or more menu items 209*d* descriptive of some or all of the location entities 302 that match the user's entered search term information 221*d* (e.g., location data 320*o*, 320*p*, 320*q*, 320*r*, and 320*t* of matched location entities 302*o*, 302*p*, 302*q*, 302*r*, and 302*t*). Therefore, each item 209*d* in list 208*d* may have an associated indicator 203*d* on map 202*d*.

Selection 222*d* may also be provided for highlighting a particular item 209*d* in list 208*d*. As shown in FIG. 4D, selection 222*d* may highlight item 209*d'* associated with location 320*p* (e.g., "Rome, Italy"). When a particular item 209 is highlighted by selection 222, the indicator 203 associated with that item 209 may be altered. For example, as shown in FIG. 4D, when item 209*d'* associated with location 320*p* (e.g., "Rome, Italy") is highlighted by selection 222*d*, the visual indicator 203 associated with location 320*p* (e.g., the visual indicator 203 positioned on map 202*d* based on position metadata 348*p*) may be altered to distinguish that indicator from all other indicators of map 202*d* (e.g., see visual indicator 203*d'*, which may include a dot and an outer ring at a position on map 202*d* associated with Rome, Italy). When the user scrolls selection 222*d* to highlight another menu item 209 in list 208, the visual indicator 203 associated with that selected item 209 may be altered, and the visual indicator 203*d'* associated with previously selected item 209*d'* may return to its normal appearance (e.g., as it appeared on map 202*c* of FIG. 4C). This may provide the user with an easy way to correlate each listed item 209 in list 208 with its respective visual indicator 203 on map 202. This may help the user determine which search result is desired.

Application 200 may also supplement user search information 221 in search field 228 of UI 210 with at least a portion of selected item 209. For example, as shown in FIG. 4D, the portion of location data 320*p* not provided by user search information 221*d* (e.g., "me, Italy" portion 320*p'*) may be automatically filled into search field 228 to help guide the user.

In some embodiments, items 209 may be ordered in list 208 alphabetically. Alternatively, items 209 may be ordered in list 208 based on any other criteria. For example, items 209 may be ordered based on indicator value metadata 344 of each entity 302 represented by an item in the list, such that the location with the highest population may be listed before locations with lower populations. It is to be understood that while only some of the menu items 209 may be displayed at a particular time on display 112, any menu item 209 of list 208 may be displayed and highlighted by selection 222 when the user scrolls selection 222 up or down the list (e.g., as indicated by scroll cursor 207*d* of FIG. 4D).

In some embodiments, the menu item 209 to be provided at the top of the portion of list 208 that is initially displayed on display 112 (e.g., item 209*d'* associated with location 320*p* in FIG. 4D) may not necessarily be the item 209 at the top of list 208 (e.g., list 208*d* may be initially presented with scroll cursor 207*d* not at the top of the list). For example, item 209*d'* positioned at the top of the portion of list 208*d* initially displayed on display 112 may be based on any suitable criteria, such as indicator value metadata 344 associated with the items 209*d* (e.g., based on the population of each location identified in list 208*d*). That is, even if there were other entities 302 in table 300 that matched user search information 221*d* and that were alphabetically ahead of location data 320*p* for "Rome, Italy" (e.g., location data 320*o* for "Rome, Ga., U.S.A."), the menu item 209*d* associated with location data 320*p* may still be the item positioned at the top of the portion of list 208*d* initially displayed, based on Rome, Italy having the highest population out of all the locations included in list 208*d* (e.g., indicator value metadata 346*p* is greater than indicator value metadata 346*o*). It is to be understood that various other characteristics or data related to locations 320 of entities 302 may be used for sorting or initially displaying items 209 in list 208 besides population information. For example, previous usage data or popularity (e.g., how often the user selects a particular location), physical size (e.g., the square mileage of the location), or any other suitable information may be used.

Figure 4E:
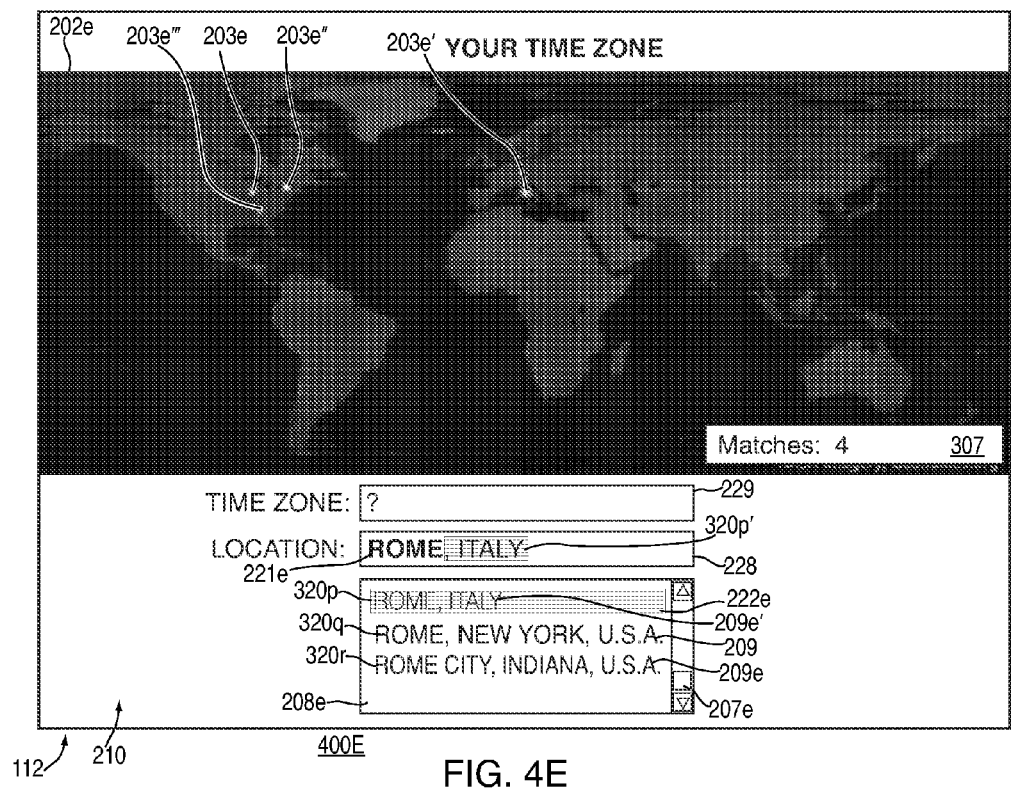

As shown in FIG. 4E, for example, user interface 210 may present visual representation 400E on display 112 in response to a user entering user search information 221*e* into search field 228. Continuing with a search based on the results presented in FIG. 4D, the user may proceed by providing search field 228 of UI input portion 220 with user search information 221*e* defined by the alphanumeric character string "ROME". For example, this may be done by simply adding "ME" to previous user search information 221*d* of FIG. 4D. In response to receiving this new user search term information 221*e*, search engine 250 may compare user search term information 221*e* to at least certain information defined by one or more location entities 302 of table 300 in database 260. For example, engine 250 may compare user search term information 221*e* to alphanumeric strings of valid term metadata 342 of one or more location entities 302 of database 260. In some embodiments, engine 250 may compare information 221*e* with information from only those entities 302 that provided a match during the processing of information 221*d* (i.e., as "RO" search information 221*d* may be inclusive of "ROME" search information 221*e*). This may reduce the processing requirements of application 200. For every detected match between user search term information 221*e* and valid term metadata 342 of one or more location entities 302, engine 250 may extract the position metadata 348 of each of those matched entities 302. Then, application 200 may update the presentation of map 202 with one or more visual indicators 203 at one or more positions on map 202 based at least partially on this extracted position metadata 348 associated with each respective matched entity.

Following the example of user search term information 221*e* defined by the alphanumeric characters "ROME", controller 240 may process information 221*e* by using engine 250 to compare information 221*e* with table 300 to detect matches with valid term metadata 342 of at least location entities 302*o*, 302*p*, 302*q*, and 302*r*. Therefore, application 200 may update the presentation of map 202 with one or more visual indicators 203 at positions on map 202 based at least partially on position metadata 348 of at least location entities 302o, 302p, 302q, and 302r. As shown in FIG. 4E, UI output portion 230 may generate and present a map 202e that may, for example, be substantially similar to map 202d of FIG. 4D (e.g., an artistic night view of the globe).

Based on the processing of user search term information 221e by controller 240, UI output portion 230 may also generate and present visual indicators 203e at positions on map 202e indicative of some or all of the potential location entities 302 that match the user's entered search term information 221e (i.e., position metadata 348o, 348p, 348q, and 348r of matched location entities 302o, 302p, 302q, and 302r). Like indicators 203d of FIG. 4D, each visual indicator 203e may be a bright dot that may contrast well with the otherwise dark representation of the night view of the globe of map 202e. However, the number of indicators 203e of FIG. 4E may be less than the number of indicators 203d of FIG. 4D due to the search results being limited by the more specific user search term information 221e as compared to user search term information 221d. In some embodiments, map 202 may be altered based on the relative positioning of its indicators 203. For example, map 202e may be a more zoomed-in view of a portion of the globe including indicators 203e (e.g., a view of just North America and Europe) as compared to the full view of the globe of map 202d. This may allow map 202 to display only those portions necessary for indicating the locations associated with the current search results.

Furthermore, based on the processing of user search term information 221e by controller 240, UI output portion 230 may also generate and present menu list 208e with one or more menu items 209e descriptive of some or all of the location entities 302 that match the user's entered search term information 221e (e.g., location data 320o, 320p, 320q, and 320r of matched location entities 302o, 302p, 302q, and 302r). Therefore, each item 209e in list 208e may have an associated indicator 203e on map 202e.

Selection 222e may also be provided for highlighting a particular item 209e in list 208e. As shown in FIG. 4E, selection 222e may highlight item 209e' associated with location 320p (e.g., "Rome, Italy"). When a particular item 209 is highlighted by selection 222, the indicator 203 associated with that item 209 may be altered. For example, as shown in FIG. 4E, when item 209e' associated with location 320p (e.g., "Rome, Italy") is highlighted by selection 222e, the visual indicator 203 associated with location 320p (e.g., the visual indicator 203 positioned on map 202e based on position metadata 348p) may be altered to distinguish that indicator from all other indicators of map 202e (e.g., see visual indicator 203e', which may include a dot and an outer ring at a position on map 202e associated with Rome, Italy). When the user scrolls selection 222e to highlight another menu item 209 in list 208, the visual indicator 203 associated with that selected item 209 may be altered, and the visual indicator 203e' associated with previously selected item 209e' may return to its normal appearance (e.g., as it appeared on map 202c of FIG. 4C). This may provide the user with an easy way to correlate each listed item 209 in list 208 with its respective visual indicator 203 on map 202. This may help the user determine which search result is desired.

Application 200 may also supplement user search information 221 in search field 228 of UI 210 with at least a portion of selected item 209. For example, as shown in FIG. 4E, the portion of location data 320p not provided by user search information 221e (e.g., ", Italy" portion 320p') may be automatically filled into search field 228 to help guide the user.

As shown in FIGS. 4B-4E, each visual indicator 203 may be a bright dot that may contrast well with the otherwise dark representation of a night view of a globe of map 202. As may not be shown by FIGS. 4B-4E, however, is that search results represented on map 202 by indicators 203 may be "twinkling" (e.g., in order to look like stars in a sky) or may be otherwise constantly changing their appearance to add some activity to map 202 for engaging the user. For example, indicators 203 that are represented as twinkling dots may potentially resemble the appearance of actual city lights being turned on and off as if being viewed from space. This may be pleasing to a user and may enhance the experience.

In some embodiments, at least some of the visual indicators 203 on a map 202 may have a visual characteristic at least partially dependent on the indicator value metadata 344 of the location entity 302 represented by the indicator 203. For example, the brightness of each indicator 203 may be determined based on the value of its associated indicator value metadata 344. This may allow an indicator 203 associated with a location having a relatively high human population to be brighter than an indicator 203 associated with a location having a relatively small human population. For example, as shown in FIG. 4E, indicator 203e'', which may be associated with entity 302q for "Rome, N.Y.", may be brighter than indicator 203e''', which may be associated with entity 302r for "Rome City, Ind.", due to indicator value metadata 344q being larger than indicator value metadata 344r. The effect that indicator value metadata 344 may have on the appearance of indicators 203 may vary based on the number of indicators 203 presented on a map 202.

Figure 4F:
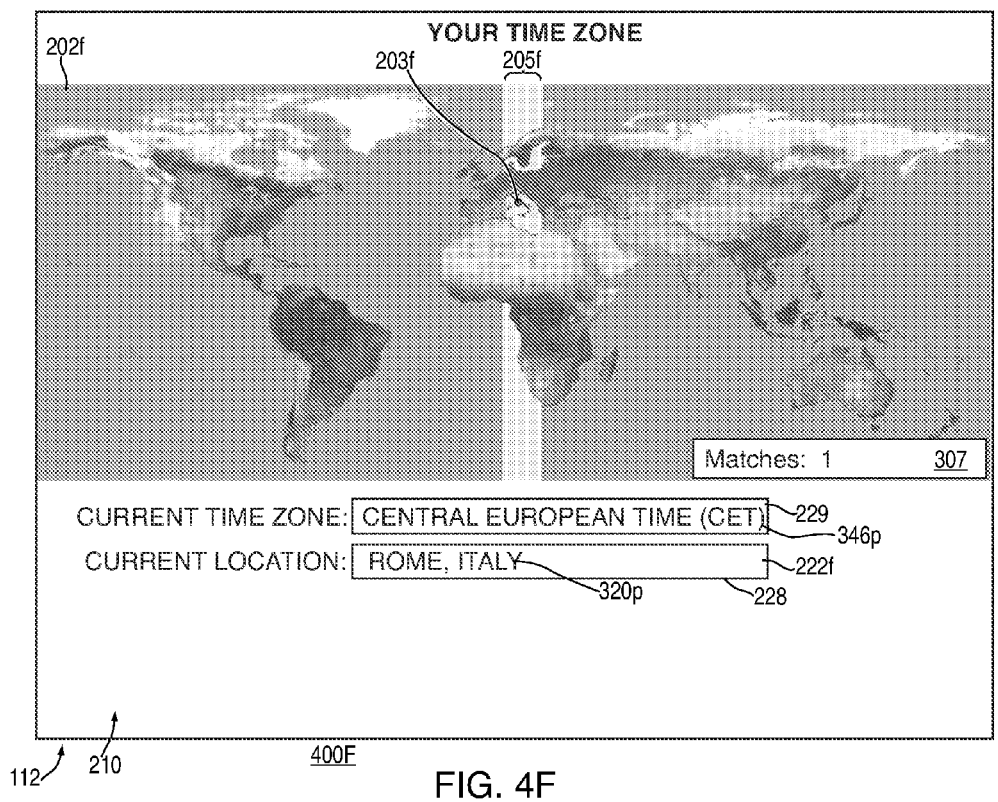

As shown in FIG. 4F, for example, user interface 210 may present visual representation 400F on display 112 in response to a user selecting and confirming a particular search result. Continuing with a search based on the results presented in FIG. 4E, the user may proceed by confirming selection 222e as the desired search result. As shown in FIG. 4E, selection 222e may highlight item 209e' associated with location 320p (e.g., "Rome, Italy") of location entity 302p. The user may confirm this selection using any suitable mechanism (e.g., by pressing a particular input mechanism of input component 110, such as a mouse-click on a selected menu item 209 or indicator 203). When a particular selection of a search result (e.g., a menu item 209 associated with a location 320 of an entity 302) is confirmed, application 200 may transition from a "search mode" to a "confirmed mode". For example, when the selection of a location is confirmed, application 200 may transition map 202 from a "search mode view" (e.g., an artistic view and/or a night view and/or a zoomed-out view of the globe) to a "confirmed mode view" (e.g., a photorealistic view and/or a day view and/or a zoomed-in view of the globe). Therefore, application 200 may update the presentation of map 202 to signify the confirmation.

Additionally, application 200 may remove menu list 208 and all indicators 203 not associated with the confirmed search result. As shown in FIG. 4F, UI output portion 230 may generate and present a map 202f that may, for example, be substantially similar to map 202a of FIG. 4A (e.g., a photorealistic day view of the globe). Based on the user confirmation of a particular search result, UI output portion 230 may also generate and present a visual indicator 203f at the position on map 202f indicative of the location entity 302 associated with the confirmed result (i.e., position metadata 348p of confirmed location entity 302p). Like visual indicator 203a of FIG. 4A, indicator 203f may be a "bulls-eye" type indicator that may clearly distinguish the particular location on the day view of the globe of map 202f.

Application 200 may also update search field 228 of UI 210 with the name of the location of the confirmed entity (e.g., location data 320p). Similarly, application 200 may also update time zone field 229 of UI 210 with the name of the time zone associated with that entity (e.g., time zone metadata 346p). UI output portion 230 may also present a visual zone region 205f along a certain portion of map 202f indicative of the Central European Time Zone (e.g., using a certain shading or other highlighting technique). Thus, user interface 210 may present visual representation 400F on display 112 that is indicative of the user confirmed location information (e.g., time zone information) of device 100.

Although application 200 has been described with respect to FIGS. 4A-4F as receiving user search term information 221 defined by the alphanumeric characters processed by controller 240 for comparison with table 300 to detect matches with valid term metadata 342 of location entities 302, search term information 221 may be related to any other characteristic or metadata portion of each entity 302. For example, a user may input numeric values using search term information 221 and controller 240 may compare numeric information 221 with population data of table 300 (e.g., indicator value metadata 344), such that a user's search may provide results based on entities 302 whose population numbers at least partially match the user search information 221.

The processes described herein, as well as any other aspects of the invention, may each be implemented by software, but can also be implemented in hardware or a combination of hardware and software. They each may also be embodied as computer readable code recorded on a computer readable medium. The computer readable medium may be any data storage device that can store data which can thereafter be read by a computer system. Examples of the computer readable medium include read-only memory, random-access memory, flash memory, CD-ROMs, DVDs, magnetic tape, and optical data storage devices. The computer readable medium can also be distributed over network-coupled computer systems so that the computer readable code is stored and executed in a distributed fashion.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above-described embodiments of the invention are presented for purposes of illustration and not of limitation.

What is claimed is:

1. A computer-implemented method, comprising:
displaying, at a computing device, an interface including a search mode view of a map, a time zone display and a search box;
receiving input corresponding to textual or numerical input into the search box, wherein the input causes a display of a scroll menu;
displaying a list of geographic locations in the scroll menu, wherein the geographic locations are displayed according to the received input;
displaying visual indicators on the search mode view of the map, wherein the visual indicators are displayed according to the list of geographic locations, and wherein a visual indicator contrasts selected geographic locations;
receiving scroll input corresponding a selection of a geographic location from the list of geographic locations in the scroll menu, wherein scrolling includes highlighting geographic locations on the list of geographic locations, wherein the selected geographic location is associated with a time zone; and
updating the interface, wherein updating includes replacing the search mode view with a confirmed mode view, and updating the time zone display, wherein the confirmed mode view includes a time zone region corresponding to the time zone associated with the selected geographic region, and wherein the updated time zone display includes time zone data corresponding to the time zone associated with the selected geographic region and the visual indicator associated with the selected geographic location.

2. The method of claim 1, further comprising:
receiving additional input corresponding to textual or numerical input into the search box;
truncating the list of geographic locations based on the received additional input;
updating the display of the visual indicators based on the truncated list of geographic locations; and
receiving selection input corresponding a selection of a geographic location from the updated list of geographic locations.

3. The method of claim 1, wherein the interface includes a search result number, and wherein the search result number corresponds to the list of geographic locations.

4. The method of claim 1, wherein the confirmed mode view includes a different background color than the search mode view.

5. The method of claim 1, wherein the list of geographic locations is ordered based on population data associated with each geographic location.

6. The method of claim 1, wherein the visual indicators associated with the geographic locations have a brightness that corresponds to population data associated with a geographic location.

7. A computer-implemented system, comprising:
One or more data processors; and
One or more non-transitory computer-readable storage media containing instructions configured to cause the one or more processors to perform operations including:
displaying, at a computing device, an interface including a search mode view of a map, a time zone display and a search box;
receiving input corresponding to textual or numerical input into the search box, wherein the input causes a display of a scroll menu;
displaying a list of geographic locations in the scroll menu, wherein the geographic locations are displayed according to the received input;
displaying visual indicators on the search mode view of the map, wherein the visual indicators are displayed according to the list of geographic locations, and wherein a visual indicator contrasts selected geographic locations;
receiving scroll input corresponding a selection of a geographic location from the list of geographic locations in the scroll menu, wherein scrolling includes highlighting geographic locations on the list of geographic locations, wherein the selected geographic location is associated with a time zone; and
updating the interface, wherein updating includes replacing the search mode view with a confirmed mode view, and updating the time zone display, wherein the confirmed mode view includes a time zone region corresponding to the time zone associated with the selected geographic region, and wherein the updated time zone display includes time zone data corresponding to the time zone associated with the selected geographic region and the visual indicator associated with the selected geographic location.

8. The system of claim 7, further comprising instructions configured to cause the one or more processors to perform operations including:
receiving additional input corresponding to textual or numerical input into the search box;
truncating the list of geographic locations based on the received additional input;
updating the display of the visual indicators based on the truncated list of geographic locations; and
receiving selection input corresponding a selection of a geographic location from the updated list of geographic locations.

9. The system of claim 7, wherein the interface includes a search result number, and wherein the search result number corresponds to the list of geographic locations.

10. The system of claim 7, wherein the confirmed mode view includes a different background color than the search mode view.

11. The system of claim 7, wherein the list of geographic locations is ordered based on population data associated with each geographic location.

12. The system of claim 7, wherein the visual indicators associated with the geographic locations have a brightness that corresponds to population data associated with a geographic location.

13. A computer-program product, tangibly embodied in a non-transitory machine readable storage medium, including instructions configured to cause a data processing apparatus to:
display, at a computing device, an interface including a search mode view of a map, a time zone display and a search box;
receive input corresponding to textual or numerical input into the search box, wherein the input causes a display of a scroll menu;
display a list of geographic locations in the scroll menu, wherein the geographic locations are displayed according to the received input;
display visual indicators on the search mode view of the map, wherein the visual indicators are displayed according to the list of geographic locations, and wherein a visual indicator contrasts selected geographic locations;
receive scroll input corresponding a selection of a geographic location from the list of geographic locations in the scroll menu, wherein scrolling includes highlighting geographic locations on the list of geographic locations, wherein the selected geographic location is associated with a time zone; and
update the interface, wherein updating includes replacing the search mode view with a confirmed mode view, and updating the time zone display, wherein the confirmed mode view includes a time zone region corresponding to the time zone associated with the selected geographic region, and wherein the updated time zone display includes time zone data corresponding to the time zone associated with the selected geographic region and the visual indicator associated with the selected geographic location.

14. The computer-program product of claim 13, further comprising instructions configured to cause the data processing apparatus to:
receive additional input corresponding to textual or numerical input into the search box;
truncate the list of geographic locations based on the received additional input;
update the display of the visual indicators based on the truncated list of geographic locations; and
receive selection input corresponding a selection of a geographic location from the updated list of geographic locations.

15. The computer-program product of claim 13, wherein the interface includes a search result number, and wherein the search result number corresponds to the list of geographic locations.

16. The computer-program product of claim 13, wherein the confirmed mode view includes a different background color than the search mode view.

17. The computer-program product of claim 13, wherein the list of geographic locations is ordered based on population data associated with each geographic location.

18. The computer-program product of claim 13, wherein the visual indicators associated with the geographic locations have a brightness that corresponds to population data associated with a geographic location.

* * * * *